(12) United States Patent
Lin et al.

(10) Patent No.: US 9,486,984 B2
(45) Date of Patent: Nov. 8, 2016

(54) STEEL SHEET AND FABRICATION METHOD THEREOF

(71) Applicants: National Taiwan University, Taipei (TW); CHINA STEEL CORPORATION, Kaohsiung (TW)

(72) Inventors: Chao-Sung Lin, Taipei (TW); Tsung-Jung Chen, Kaohsiung (TW); Chun-Hung Wu, Taipei (TW)

(73) Assignees: National Taiwan University, Taipei (TW); CHINA STEEL CORPORATION, Kaohsiung (TW)

( * ) Notice: Subject to any disclaimer, the term of this patent is extended or adjusted under 35 U.S.C. 154(b) by 0 days.

(21) Appl. No.: 14/703,895

(22) Filed: May 5, 2015

(65) Prior Publication Data
US 2015/0314569 A1  Nov. 5, 2015

(30) Foreign Application Priority Data

May 5, 2014  (TW) .............................. 103115972 A

(51) Int. Cl.
*B32B 15/01*  (2006.01)
*C21D 3/04*  (2006.01)
(Continued)

(52) U.S. Cl.
CPC ............. *B32B 15/01* (2013.01); *B32B 15/013* (2013.01); *C21D 3/04* (2013.01); *C22C 18/00* (2013.01); *C23C 8/10* (2013.01); *C23C 10/28* (2013.01);
(Continued)

(58) Field of Classification Search
CPC ..... B32B 15/18; B32B 15/04; B32B 15/013; B32B 15/015; B32B 15/01; C22C 18/00; Y10T 428/12576; Y10T 428/12799; Y10T 428/12847; Y10T 428/12854; Y10T 428/12972; Y10T 428/12979; Y10T 428/2495; Y10T 428/24967; Y10T 428/24975; Y10T 428/263; Y10T 428/264; Y10T 428/265; Y10T 428/12583; Y10T 428/1259; Y10T 428/12611; Y10T 428/12618; Y10T 428/12625; C23C 10/28; C23C 28/345; C23C 28/321; C23C 8/10; C23C 28/025; C23C 28/021; C23C 8/12; C23C 2/06; C23C 28/04; C23C 28/30; C23C 28/34; C23C 30/00
See application file for complete search history.

(56) References Cited

U.S. PATENT DOCUMENTS 4,520,077 A   5/1985  Lavezzari
4,548,868 A   10/1985  Yonezawa et al.
(Continued)

FOREIGN PATENT DOCUMENTS

CN   1147031   4/1997
CN   102896813   1/2013
(Continued)

OTHER PUBLICATIONS

Sylvie Dionne, "The Characterization of Continuous Hot-Dip Galvanized and Galvannealed Steels," JOM: The Journal of The Minerals, Metals & Materials Society, vol. 58 Issue 3, Mar. 2006, pp. 32-pp. 40.
(Continued)

*Primary Examiner* — Michael E La Villa
(74) *Attorney, Agent, or Firm* — Jianq Chyun IP Office

(57) ABSTRACT

Provided is a steel sheet including an iron-based material, a first coating layer disposed on the iron-based material, and a second coating layer disposed on the first coating layer, wherein the first coating layer includes a zinc alloy and the second coating layer consists essentially of chromium and carbon.

14 Claims, 11 Drawing Sheets

(51) Int. Cl.
*C23C 28/02* (2006.01)
*C23C 8/10* (2006.01)
*C22C 18/00* (2006.01)
*C23C 10/28* (2006.01)
*C23C 28/00* (2006.01)
*C21D 8/02* (2006.01)

(52) U.S. Cl.
CPC ........... C23C 28/021 (2013.01); C23C 28/025 (2013.01); C23C 28/321 (2013.01); C23C 28/345 (2013.01); *C21D 8/0278* (2013.01); *C21D 2211/005* (2013.01); *C21D 2211/009* (2013.01); *Y10T 428/1259* (2015.01); *Y10T 428/12576* (2015.01); *Y10T 428/12583* (2015.01); *Y10T 428/12611* (2015.01); *Y10T 428/12618* (2015.01); *Y10T 428/12625* (2015.01); *Y10T 428/12799* (2015.01); *Y10T 428/12847* (2015.01); *Y10T 428/12854* (2015.01); *Y10T 428/12972* (2015.01); *Y10T 428/12979* (2015.01); *Y10T 428/2495* (2015.01); *Y10T 428/24967* (2015.01); *Y10T 428/24975* (2015.01); *Y10T 428/263* (2015.01); *Y10T 428/264* (2015.01); *Y10T 428/265* (2015.01)

(56) References Cited

U.S. PATENT DOCUMENTS

| 8,187,448 | B2 | 5/2012 | Rousseau et al. | |
|---|---|---|---|---|
| 2006/0099439 | A1* | 5/2006 | Kochilla | C09D 5/4488 |
| | | | | 428/626 |
| 2008/0178477 | A1* | 7/2008 | Buchtmann | B26B 21/60 |
| | | | | 30/350 |
| 2012/0321903 | A1* | 12/2012 | Nakamaru | B32B 15/013 |
| | | | | 428/450 |
| 2014/0042033 | A1 | 2/2014 | Schulz et al. | |

FOREIGN PATENT DOCUMENTS

| CN | 103348034 | 10/2013 |
|---|---|---|
| EP | 0174019 | 3/1989 |
| EP | 2602359 | 6/2013 |

OTHER PUBLICATIONS

Chang Wook Lee, et al., "Galvanized Coating Evolution During Hot Stamping," Proceedings—8th International Conference on Zinc and Zinc Alloy Coated Steel Sheet, Galvatech 2011 : Genova (Italy), Jun. 21-24, 2011, pp. 1-pp. 8.

Dong Wei Fan, et al., "State-of-the-Knowledge on Coating Systems for Hot Stamped Parts," steel research international, vol. 83, Issue 5, May 2012, pp. 412-pp. 433.

Jens Kondratiuk, et al., "Zinc coatings for hot sheet metal forming: Comparison of phase evolution and microstructure during heat treatment," Surface & Coatings Technology, vol. 205, Issue 17-18, May 25, 2011, pp. 4141-pp. 4153.

Chang Wook Lee, "Liquid-Metal-Induced Embrittlement of Zn-Coated Hot Stamping Steel," Metallurgical and Materials Transactions A, Dec. 2012, vol. 43, Issue 13, pp. 5122-pp. 5127.

Coline Beal, et al., "Liquid zinc embrittlement of twinning-induced plasticity steel," Scripta Materialia, vol. 66, Issue 12, Jun. 2012, pp. 1030-pp. 1033.

Coline Beal, et al., "Embrittlement of a zinc coated high manganese TWIP steel," Materials Science and Engineering: A, vol. 543, May 1, 2012, pp. 76-pp. 83.

H. Karbasian, et al., "A review on hot stamping," Journal of Materials Processing Technology, vol. 210, Issue 15, Nov. 19, 2010, pp. 2103-pp. 2118.

\* cited by examiner

STEEL SHEET AND FABRICATION METHOD THEREOF

CROSS-REFERENCE TO RELATED APPLICATION

This application claims the priority benefit of Taiwan application serial no. 103115972, filed on May 5, 2014. The entirety of the above-mentioned patent application is hereby incorporated by reference herein and made a part of this specification.

BACKGROUND OF THE INVENTION

1. Field of the Invention

The invention is related to a steel sheet and a fabrication method thereof, and more particularly, to a steel sheet containing a zinc alloy coating layer on a surface thereof and a fabrication method thereof.

2. Description of Related Art

Iron and steel materials are currently one of the most commonly used industrial materials. To improve corrosion resistance of iron and steel workpieces, one known method includes forming a coating layer on a surface of an iron-based material, such as forming a layer of metal zinc with an electroplating method or a hot-dip coating method. There are two principles of corrosion prevention for a galvanized coating layer. The first isolates contact between the iron-based material and the environment by covering the iron-based material to achieve corrosion prevention, and the second achieves corrosion prevention through the so-called "sacrificial anode protection method." Specifically, a metal having a stronger ability of reduction is used as a guard electrode and connected to a protected metal to form a primary cell. A metal having stronger ability of reduction is used as the anode and is consumed due to an oxidation reaction, and the protected metal is used as the cathode, thereby preventing corrosion.

However, if a hot stamping pre-heat treatment is to be performed on a steel sheet having a metal nickel coating layer on a surface thereof, the high temperature of the preheating step of the hot stamping significantly oxidizes the metal zinc, such that the effective content of metal zinc capable of providing a protective effect is reduced. At the same time, the high temperature may also melt zinc such that liquid zinc penetrates through the grain boundary of iron, thereby causing intergranular damage during stamping, which is the so-called liquid metal induced embrittlement (LMIE) effect. Based on the above, the surface coating layer of iron and steel materials still requires further research.

SUMMARY OF THE INVENTION

Technical Issue to be Solved

The invention provides a steel sheet and a fabrication method thereof, wherein a special, coating layer is disposed on a surface of the steel sheet, thereby providing a protective effect to a sacrificial anode. Moreover, the thermal stability of the coating layer is high, thus preventing the occurrence of the liquid metal induced embrittlement (LMIE) effect.

Technical Solution

The steel sheet of the invention includes an iron-based material, a first coating layer disposed on the iron-based, material, and a second coating layer disposed on the first coating layer, wherein the first coating layer includes a zinc alloy and the second coating layer consists essentially of chromium and carbon.

In an embodiment, the zinc alloy is a zinc-nickel alloy, a zinc-cobalt alloy, or a combination thereof.

In an embodiment, the zinc alloy is a zinc-nickel alloy, and the proportion of nickel thereof is between 16 at % and 30 at %.

In an embodiment, the zinc alloy is a zinc-nickel alloy, and the proportion of nickel is about 20 at %.

In an embodiment, the reduction potential of the zinc alloy is less than the reduction potential of the iron-based material by at least 100 mV.

In an embodiment, the melting point of the zinc alloy is higher than the austenitizing temperature of the iron-based material.

In an embodiment, the thicknesses of each of the first coating layer and the second coating layer are respectively 2 μm to 100 μm and 0.1 μm to 10 μm , and is preferably respectively 2 μm to 10 μm and 0.5 μm to 5 μm .

In an embodiment, the content of carbon in the second coaling layer is greater than 10 at %.

A fabrication method of a steel sheet of the invention Includes forming a first coating layer and a second coating layer on a surface of an iron-based material in order, wherein the first coating layer includes a zinc alloy and the second coating layer consists essentially of chromium and carbon.

In an embodiment, the fabrication method further includes forming a surface layer on the second coating layer, wherein the surface layer includes $ZnCr_2O_4$.

In an embodiment, the surface layer further includes ZnO and $Cr_2O_3$.

In an embodiment, the fabrication method further includes performing a heating step to remove carbon in the second coating layer.

In an embodiment, the fabrication method further includes performing a heating step to oxidize chromium on the surface of the second coating layer and remove carbon in the second coating layer.

In an embodiment, the heating step diffuses zinc in the first coating layer to the surface of the second coating layer at the same time.

In an embodiment, the heating step oxidizes zinc diffused to the surface of the second coating layer at the same time.

Beneficial Effects

Based on the above, the invention provides a steel sheet and a fabrication method thereof, characterized in that a composite coating layer consisting of a first coating layer containing a zinc alloy and a second coating layer containing chromium, and carbon is formed on an iron-based material. The iron-based material halving the composite coating layer can retard oxidation of the zinc alloy during heat treatment, such that the first coating layer still retains the ability to protect the iron-based material after a high-temperature treatment.

To make the above features and advantages of the invention more comprehensible, several embodiments are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Exemplary embodiments of the invention are more comprehensively described in the following with reference to figures. However, the invention can be embodied in different forms, and is not limited to the embodiments described in the present specification. For clarity, the structures and dimensions shown in the figures may be exaggerated. That is, the figures are not necessarily drawn to scale. It should also be understood that, when a particular feature is referred to as being "on" another feature or a substrate, the particular feature may be directly located on the other feature or the substrate, and may also be located in an intermediate layer. Moreover, other spatial relative terms (such as "below," "left side," and "adjacent to") and terms describing the relationship between features (such as "connected to" and "covered by") should also be understood as such.

In the present specification, ranges represented by "a numerical value to another numerical value" are schematic representations for avoiding listing all of the numerical values in the range in the specification. Therefore, the recitation of a specific numerical range discloses any numerical value in the numerical range and a smaller numerical range defined by any numerical value in the numerical range, as is the case with any numerical value and a smaller numerical range stated expressly in the specification. For instance, the range of "a size of 10 μm to 100 μm" discloses the range of "a size of 20 μm to 50 μm ," regardless of whether other numerical values are cited in the specification.

The first embodiment of the invention is related to a fabrication method of a steel sheet and is described in the following with reference to FIG. 1 to FIG. 3.

Figure 1:
FIG. 1 to FIG. 3 are fabrication processes of a steel sheet illustrated according to the first embodiment of the invention.

Referring to FIG. 1, first, an iron-based material 100 is provided. The iron-based material 100 can be a conventional iron and steel material such as a hot-rolled steel sheet, or a cold-rolled steel sheet. In addition to iron, the components of the iron-based material 100 may contain other impurities such as carbon in a content of 0.15 mass % to 0.5 mass %, silicon in a content of 0.05 mass % to 2.0 mass %, manganese in a content of 0.5 mass % to 3 mass %, phosphorus in a content less than or equal to 0.1 mass %, sulfur in a content less than or equal to 0.05 mass %, aluminum in a content less than or equal to 0.1 mass %, or nitrogen in a content less than or equal to 0.1 mass %. The main component of the iron-based material 100 is, for instance, ferrite or ferrate and pearlite.

Figure 2:
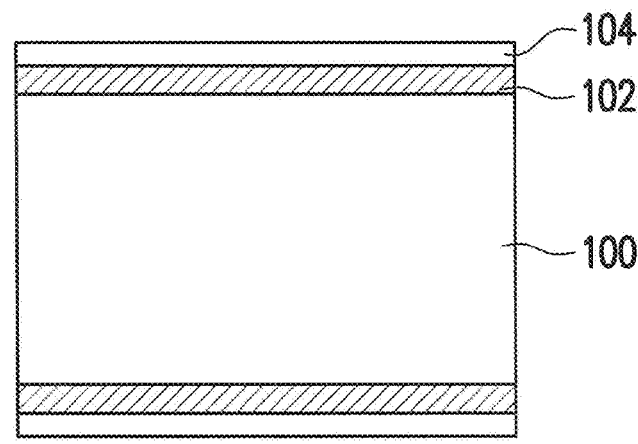

Referring to FIG. 2, next, a first coating layer 102 and a second coating layer 104 are formed on the surface of the iron-based material 100 in order. The first coating layer 102 contains a zinc alloy, and the zinc alloy is, for instance, a zinc-nickel alloy, a zinc-cobalt alloy, or a combination thereof. Since the first coating layer 102 is in direct contact with the iron-based material 100 and the reduction potential thereof is lower than that of the iron-based material 100, the first coating layer 102 can be used as a "sacrificial anode" to prevent corrosion of the iron-based material 100. In this regard, the reduction potential of the zinc alloy is preferably less than the reduction potential of the iron-based material 100 by at least 100 mV, and is preferably less by at least 200 mV. Moreover, in comparison to the known metal zinc coating layer, since the material of the first coating layer 102 is zinc alloy, the melting point thereof can be significantly increased such that the first coating layer 102 is not readily melted during the hot stamping process, thereby preventing the occurrence of the LMIE effect. In this regard, the melting point of the zinc alloy is preferably higher than the austenitizing temperature (changes with material, generally between 750° C. and 950° C.) of the iron-based material 100.

More specifically, when the zinc alloy is a zinc-nickel alloy, the higher the content of nickel, the higher the melting point of the zinc-nickel alloy, and the better the thermal stability. However, at the same time, the diffusion capability of zinc is also limited (refer to the following paragraph for the affect to the diffusion of zinc), and the absolute value of the reduction potential of the zinc-nickel alloy is reduced. Taking the factors into account, in the zinc-nickel alloy, the proportion of nickel is preferably between 16 at % and 30 at %, and is more preferably about 20 at % (that is, the proportion of zinc and nickel is close to an intermetallic compound $Ni_5Zn_{21}$). It should be mentioned that, in the present specification, when "about" is used to modify a numeric value, the scope that the applicants hope to be covered is art inherent range of error known to those having ordinary skill in the art. If not particularly specified, the use of "about" means that a range of error of at least 5% is tolerated.

The forming method of the first coating layer 102 is not particularly limited, and any known .method in the art capable of forming a zinc alloy can be used, such as a physical vapor deposition process, a chemical vapor deposition process, or an electroplating process. Moreover, the thickness of the first coating layer 102 can be between 2 μm and 100 μm .

The second coating layer 104 consists essentially of chromium and carbon, and therefore the second coating layer 104 can be referred to as a chromium-carbon layer. Specifically, the main component of the second coating layer 104 is chromium, and the proportion thereof should be greater than 50 at %, such as 70 at % to 75 at %. Chromium can form a crystal structure, and carbon acts as an impurity in the chromium crystal. When a heat treatment is performed on the entire "iron-based material 100/first coating layer 102/second coating layer 104," the presence of the second coating layer 104 helps to retard oxidation of the zinc alloy of the first coating layer 102, such that the first coating layer 102 can continue to perform the function of "sacrificial anode" thereof after the heat treatment. Moreover, during the heat treatment, interaction can occur between the elements of the second coating layer 104 and the elements of the first coating layer 102 to further protect the first coating layer 102. The principle thereof is described below with reference to FIG. 3.

The forming method of the second coating layer 104 is not particularly limited. For instance, the second coating layer 104 can be formed through an electroplating process. At this point, carbon in the second coating layer 104 may come from an organic additive in an electroplating solution such as a pH adjusting agent, wherein the content thereof is preferably greater than 10 at % (refer to paragraph 0038 for explanation). Moreover, the thickness of the second coating layer 104 can be 1 μm to 10 μm.

Figure 3:
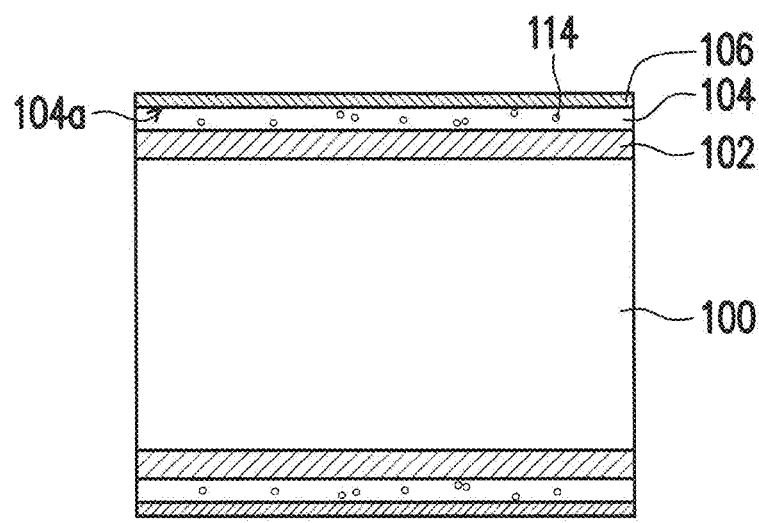

Referring to FIG. 3, next, a surface layer 106 is formed on the second coating layer 104. Specifically, the surface layer 106 is formed by performing a heat treatment on the structure shown in FIG. 2 such that the elements in the first coating layer 102 and the second coating layer 104 are diffused and oxidized. The "heat treatment" here can refer to a preheat treatment of the iron and steel material during the hot stamping process. That is, the temperature of the heat treatment is about equal to the austenitizing temperature of the iron-based material 100, which is generally between 750° C. and 950° C. During the heat treatment, carbon in the second coating layer 104 is first oxidized into carbon monoxide or carbon dioxide gas and effused, such that some vacancies 114 are left in the second coating layer 104. On the other hand, there's also a great solubility of zinc in chromium through binary phase diagram. Moreover, zinc in the first coating layer 102 begins to diffuse outside in a high-temperature environment, and the presence of the vacancies 114 facilitates diffusion of zinc to a surface 104a of the second coating layer 104. Since the quantity of the vacancies 114 is determined by the content of carbon in the second coating layer 104, to diffuse a sufficient amount of zinc to the surface 104a, the content of carbon cannot be too low. For instance, the content of carbon can be greater than or equal to 10 at %.

Zinc diffused to the surface 104a may be oxidized and thereby forming zinc oxide (ZnO). At the same time, chromium contained in the second coating layer 104 may also be oxidized in a high-temperature environment and thereby forming chromium oxide ($Cr_2O_3$). ZnO and $Cr_2O_3$ can subsequently be reacted in the high-temperature environment to form $ZnCr_2O_4$ having a spinel structure. Therefore, in conclusion, the consisting components of the surface layer 106 include ZnO, $Cr_2O_3$, and $ZnCr_2O_4$, and the content distribution of the compounds may have a certain trend, such as the amount of ZnO decreases from the outside to the inside, and the amount of $Cr_2O_3$ increases from the outside to the inside.

It should be mentioned that, in the spinel structure of $ZnCr_2O_4$, oxygen ions form a face-centered cubic (FCC) crystal structure, and zinc ions and chromium ions respectively occupy a portion of tetrahedral sites and octahedral sites in the crystal lattice. Therefore, a very compact structure is formed. The very compact structure can prevent oxygen in the environment from passing through the surface layer 106 to a considerable extent. As a result, oxidation of zinc contained in the first coating layer 102 can be further prevented.

Based on the above, the invention provides a fabrication method of a steel sheet. The method includes forming a composite coating layer consisting of a first coating layer containing a zinc alloy and a second coating layer containing chromium and carbon (note that the combination of the iron-based material and the composite coating layer also belong to one of the specific embodiments of the invention, that is, the invention is not only related to a fabrication method of a steel sheet, but is also related to a steel sheet having a special coating layer). When a hot stamping treatment is performed on the iron-based material having a composite coating layer, a surface layer containing $ZnCr_2O_4$ is formed on a surface thereof, wherein the structure of $ZnCr_2O_4$ is compact, and therefore oxidation, of the zinc alloy can be retarded, such that the first coating layer still retains the ability to protect the iron-based material after high-temperature treatment.

<Embodiments>

Embodiments are provided below to more specifically describe the invention. Although the following experiments are described, the materials used and the amount and ratio of each thereof, as well as handling details and handling procedures, etc, can be suitably modified without exceeding the scope of the invention. Accordingly, restrictive interpretation, should not be made to the invention based on the experiments described below.

Preparation of Steel Sheet—

Figure 4:
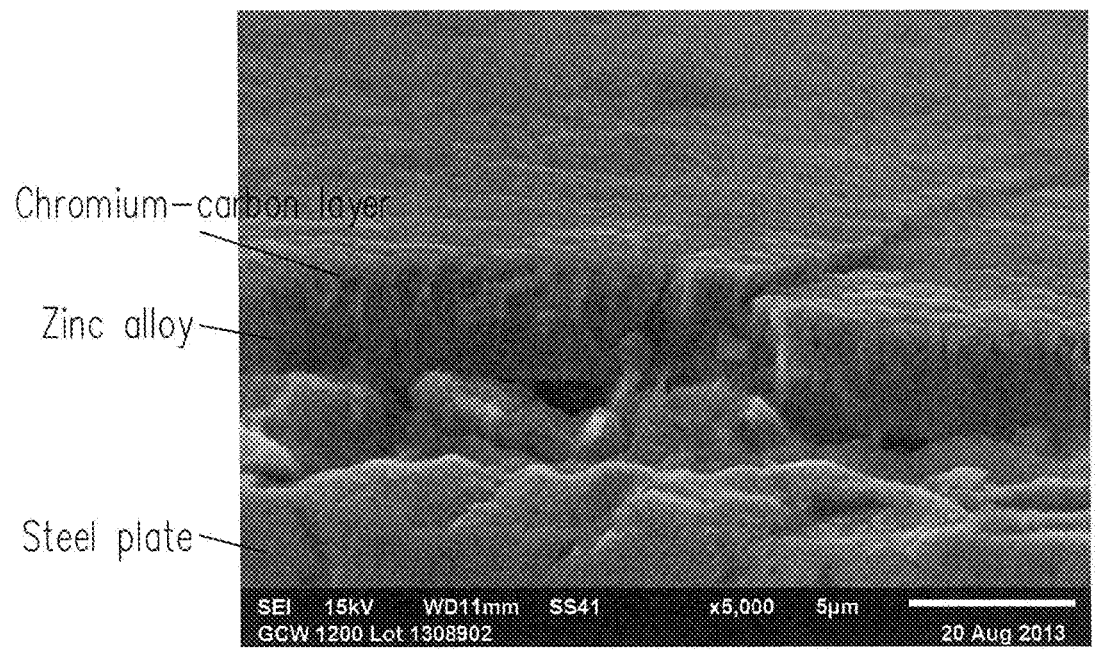
FIG. 4 is a scanning electronic microscopy (SEM) micrograph of a steel sheet sample of embodiment 1.

Embodiment 1: a layer of zinc-nickel alloy (content of nickel is about 16 at %) is formed on a steel plate with an electroplating method, and then a chromium-carbon layer (content of carbon is about 12 at %) is similarly formed with an electroplating method to complete the steel sheet sample of embodiment 1. In particular, the steel plate is a conventional commercialized low carbon steel, and in addition to iron, the consisting components thereof also include 0.04 wt. % of C, 0.002 wt % of Si, 0.18 wt % of Mn, 0.014 wt % of P, and 0.015 wt % of S. The area of electroplating of the steel plate is about 6.5 cm×2 cm. The electroplating of the zinc-nickel alloy has a constant current density (4 $A/dm^2$), and the electrolyte solution is a mixture of 0.55 M of $ZnCl_2$ solution, 0.45 M of $NiCl_2$ $6H_2O$ solution, 4.49 M of $NH_4Cl$ solution, and 0.32 M of $H_3BO_3$ solution, and the pH value thereof is 4.06. The temperature of electroplating is 35° C. The thickness of the layer of zinc-nickel alloy is about 3 μm to about 4 μm. The electroplating of the chromium-carbon layer uses a pulse current (current density of 20 $A/dm^2$, sustained for 9 ms, interval of 1 ms), the electrolyte solution is a mixture of 0.39 M of $CrCl_3 6H_2O$ solution, 3.72 M of $NH_4COOH$ solution, 0.81 M of KCl solution, 0.084 M of KBr solution, and 0.01 M of $C_{12}H_{25}OSO_3Na$ solution, and the pH value thereof is 4.48. The temperature of electroplating is 35° C. The thickness of the chromium-carbon layer is about 1 μm. FIG. 4 shows a scanning electron microscopy (SEM) micrograph of tire cross-section of the sample of embodiment 1.

Embodiments 2 and 3: the steel sheet sample of each of embodiments 2 and 3 is formed with a similar method to embodiment 1, and the difference thereof is that, in embodiments 2 and 3, the content of nickel of the zinc-nickel alloy is respectively about 19 at % and about 30 at % (respectively made at electroplating temperatures 45° C. and 55° C.).

Comparative embodiment 1: the steel sheet sample of comparative embodiment 1 is formed with a similar method to embodiment 1, and the difference thereof is that, in comparative embodiment 1, the content of carbon of the chromium-carbon layer is 5 at %.

Figure 5:
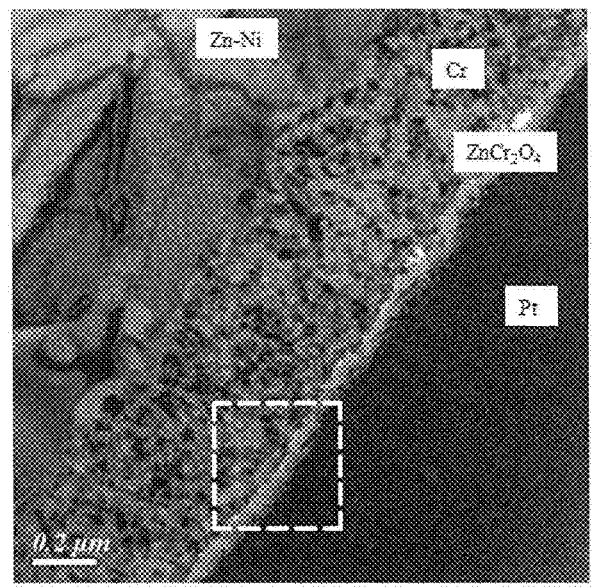
FIG. 5 is a transmission electron microscopy (TEM) micrograph of a steel sheet sample of embodiment 3.
Figure 6:
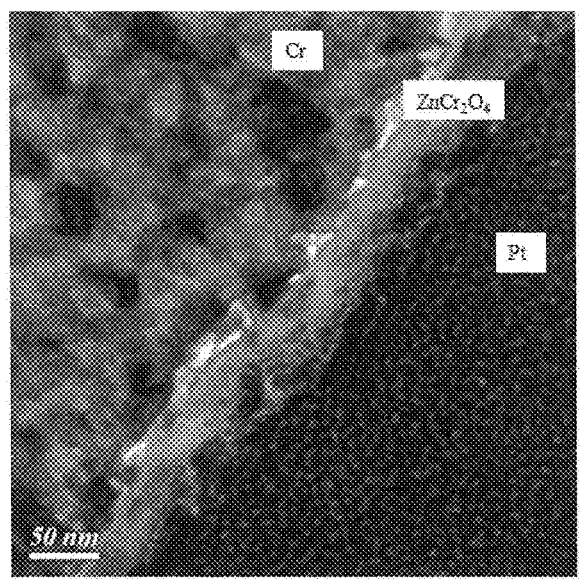
FIG. 6 is a partial enlarged view of the TEM micrograph of FIG. 5.
Figure 7:
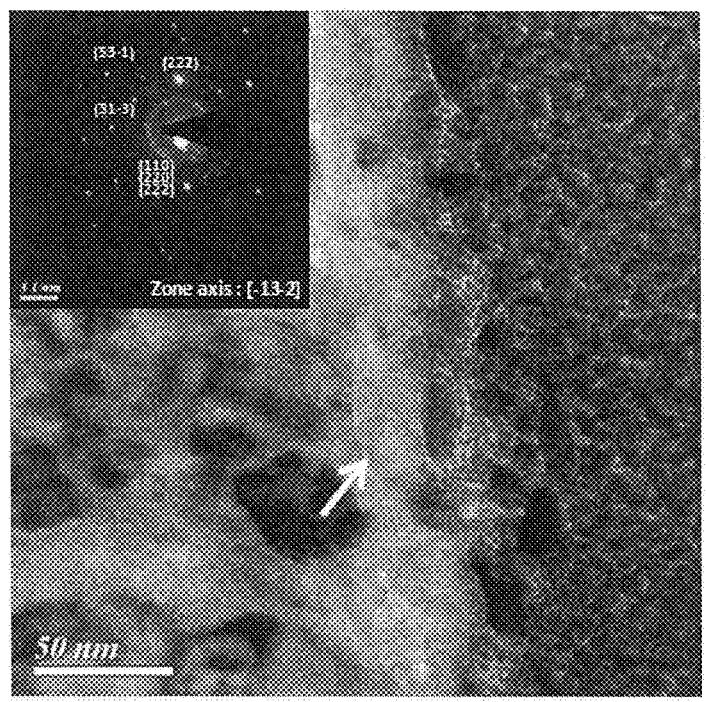
FIG. 7 is a TEM micrograph and a diffraction pattern of the $ZnCr_2O_4$ layer in FIG. 5.
Figure 8:
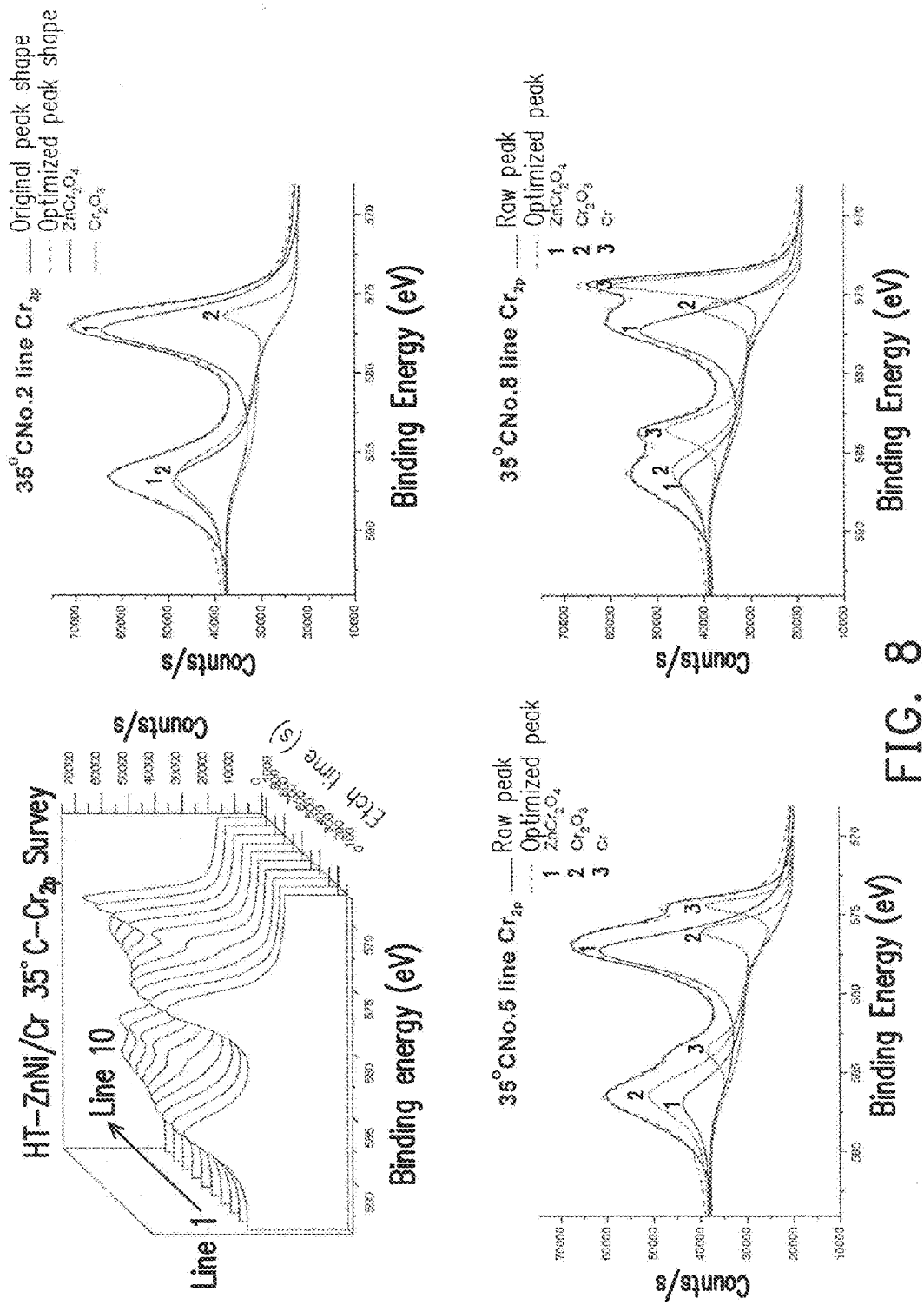
FIG. 8, FIG. 9, and FIG. 10 respectively show the binding energy analysis spectrum of X-ray photoelectron spectroscopy (XPS) of the sample of each of embodiment 1 to embodiment 3.
Figure 9:
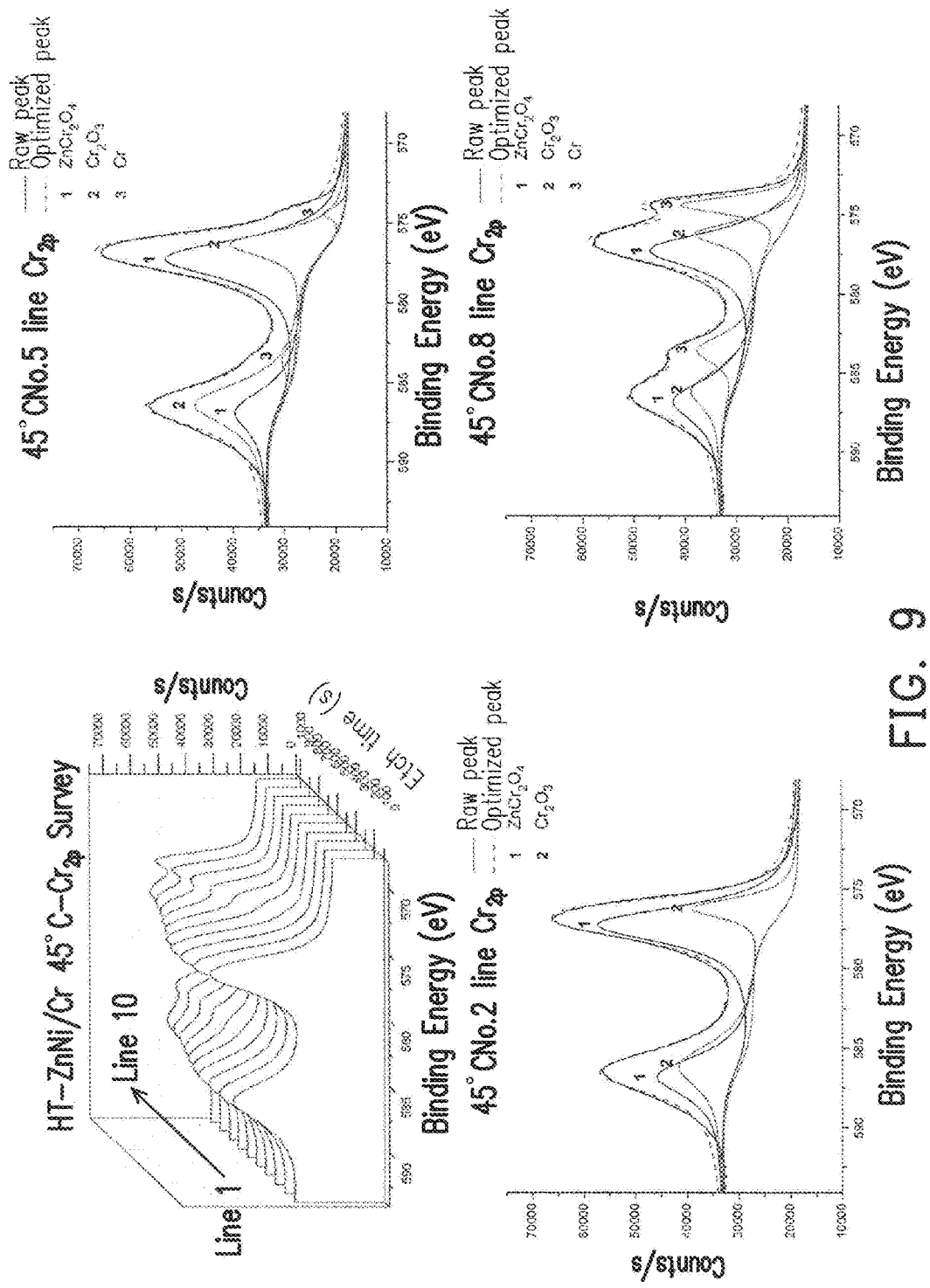
Figure 10:
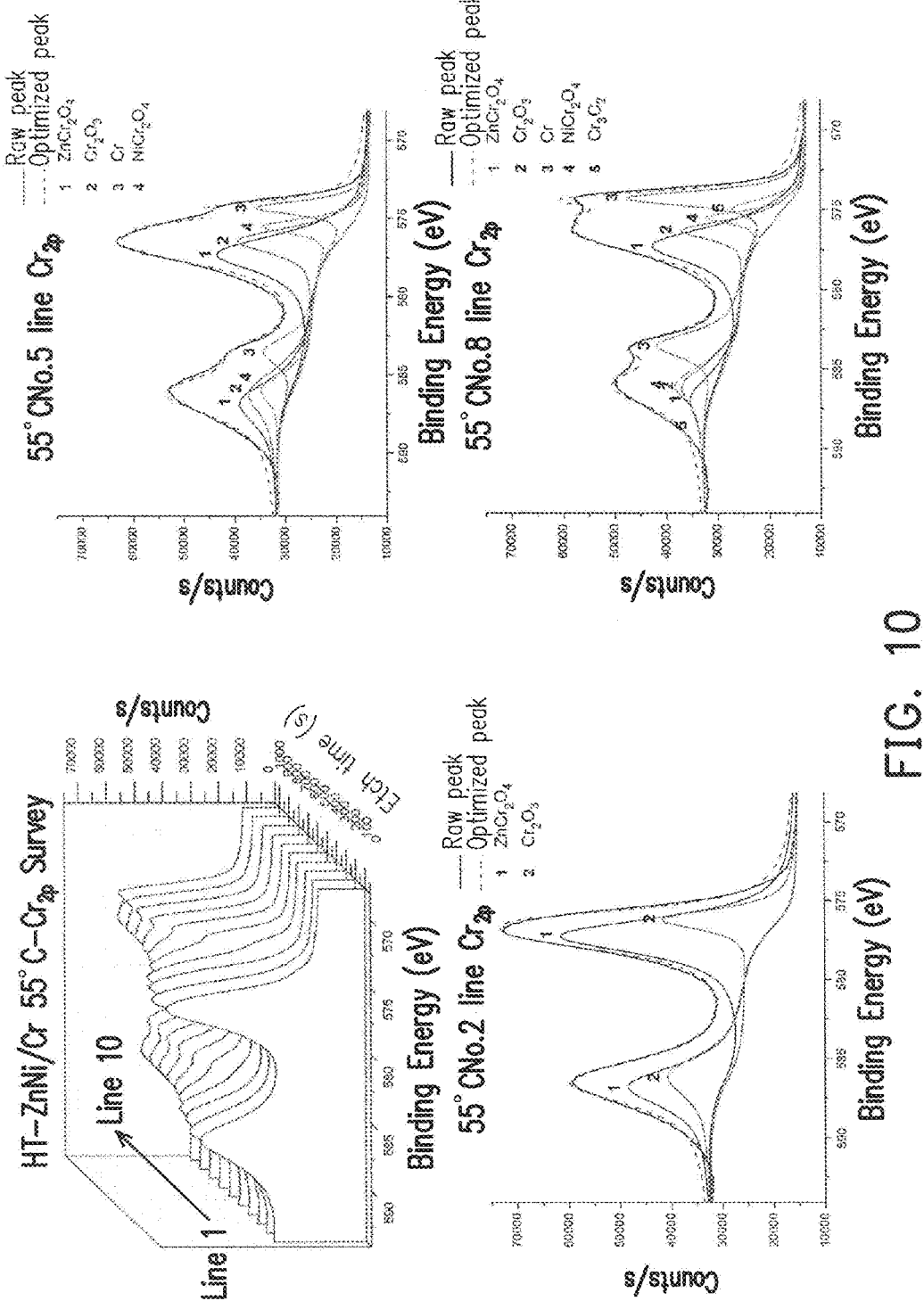
Figure 11:
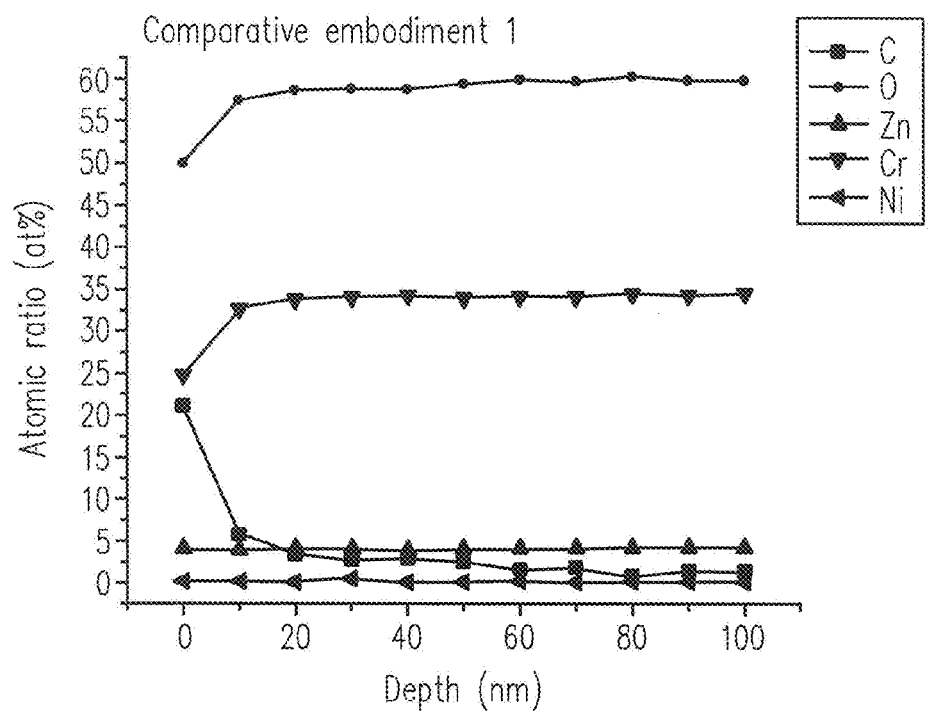
FIG. 11, FIG. 12, FIG. 13, and FIG. 14 respectively show the results of surface elements analysis of the sample of each of comparative embodiment 1 and embodiments 1 to 3.

A heat treatment (temperature of 850° C., time of 5 minutes) was respectively performed on the sample of each of comparative embodiment 1 and embodiments 1 to 3. The sample of embodiment 3 was cut into slices for transmission electron microscope (TEM) analysis to observe morphology of the sample. The obtained results are shown in FIG. 5 to FIG. 7. Furthermore, surface elements analysis was respectively performed on the four samples of each of comparative embodiment 1 and embodiments 1 to 3 through X-ray photoelectron spectroscopy (XPS). The obtained results are shown in FIG. 8 to FIG. 14.

FIG. 5 is a transmission electron microscopy (TEM) micrograph of a steel sheet sample of embodiment 3. FIG. 6 is a partial enlarged view of the TEM micrograph of FIG. 5. FIG. 7 is a TEM micrograph and a diffraction pattern of the $ZnCr_2O_4$ layer in FIG. 5. As shown in FIG. 5 to FIG. 7, in the sample of embodiment X, a surface layer containing $ZnCr_2O_4$ is formed. The $ZnCr_2O_4$ layer has a very compact structure wherein the thickness thereof is about 50 μm. Moreover, it can be found that $ZnCr_2O_4$ as the spinel structure, wherein the oxygen ions form the FCC crystal structure, and the zinc ions and the chromium ions respectively occupy a portion of tetrahedral sites and octahedral sites in the crystal lattice.

Figure 12:
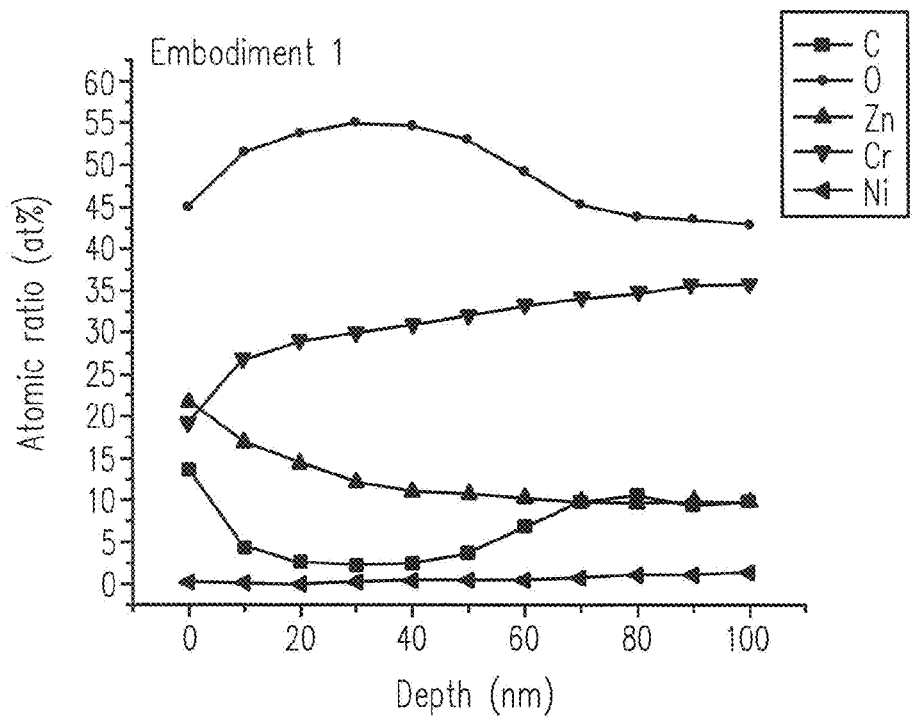
Figure 13:
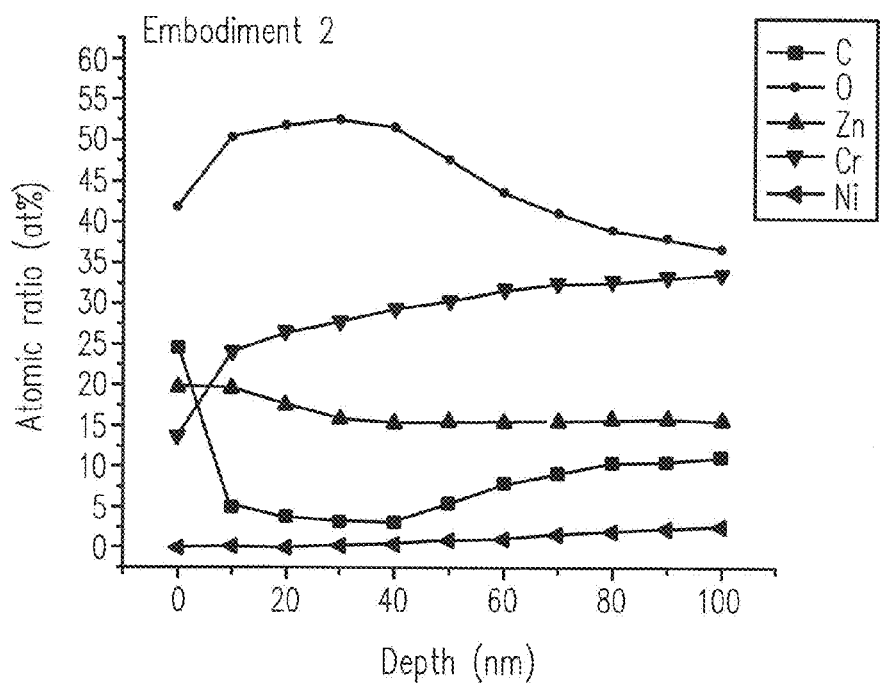
Figure 14:
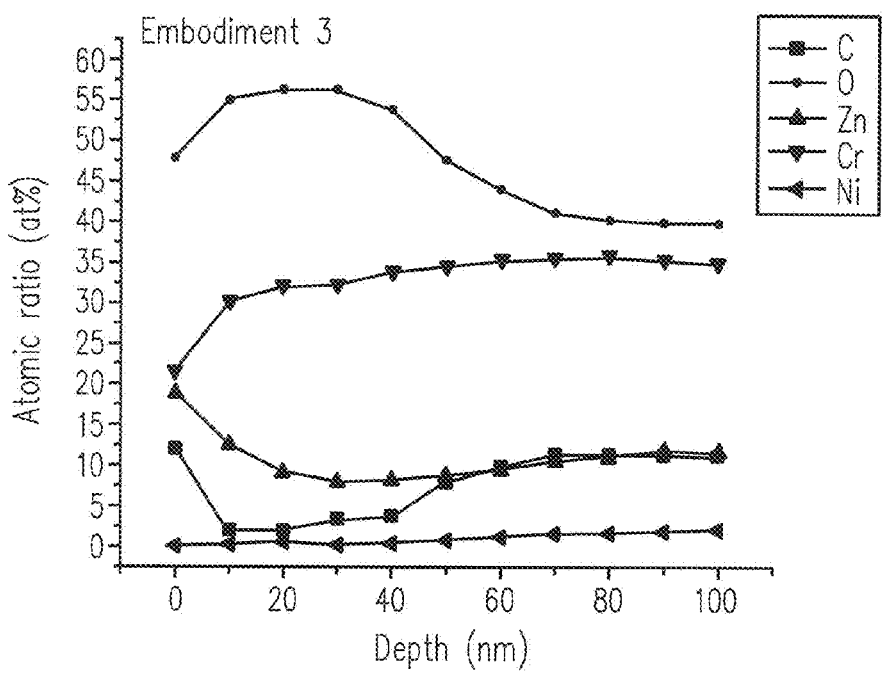
Figure 15:
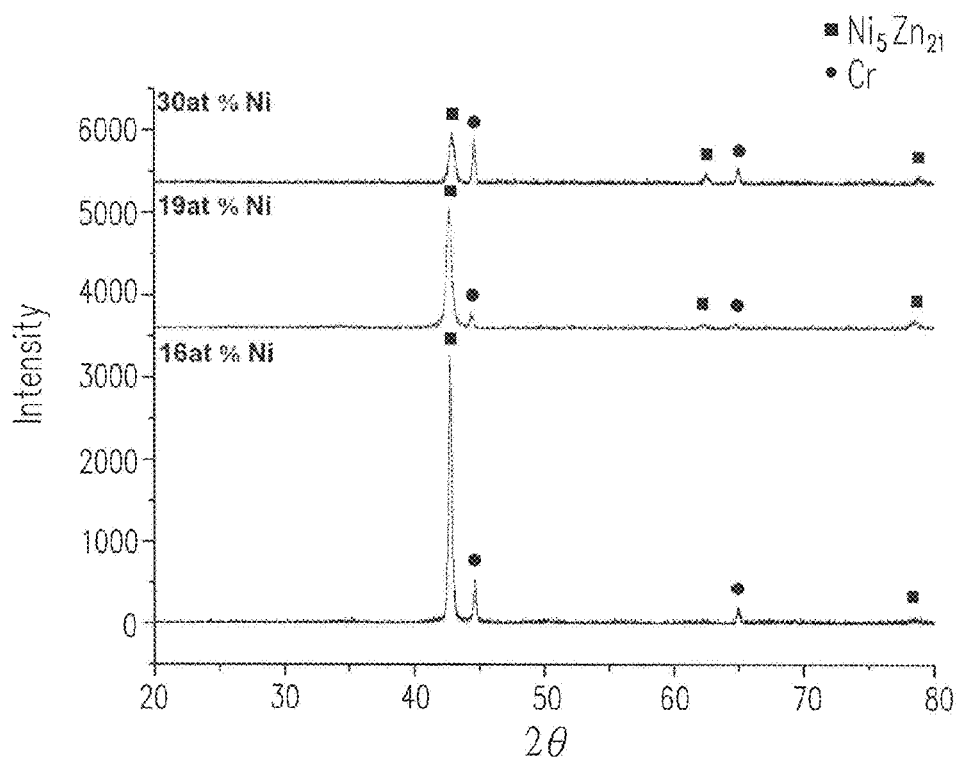
FIG. 15 and FIG. 16 respectively show the X-ray diffraction spectrum of the sample of each of embodiments 1 to 3 before heat treatment and after heat treatment.
Figure 16:
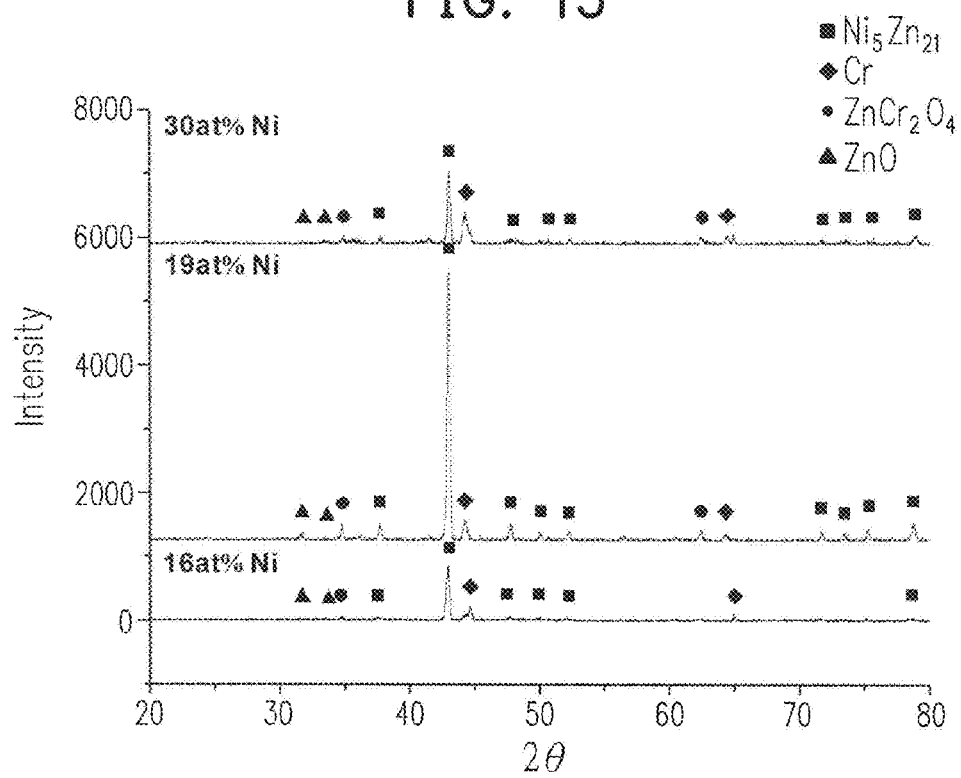
Figure 17:
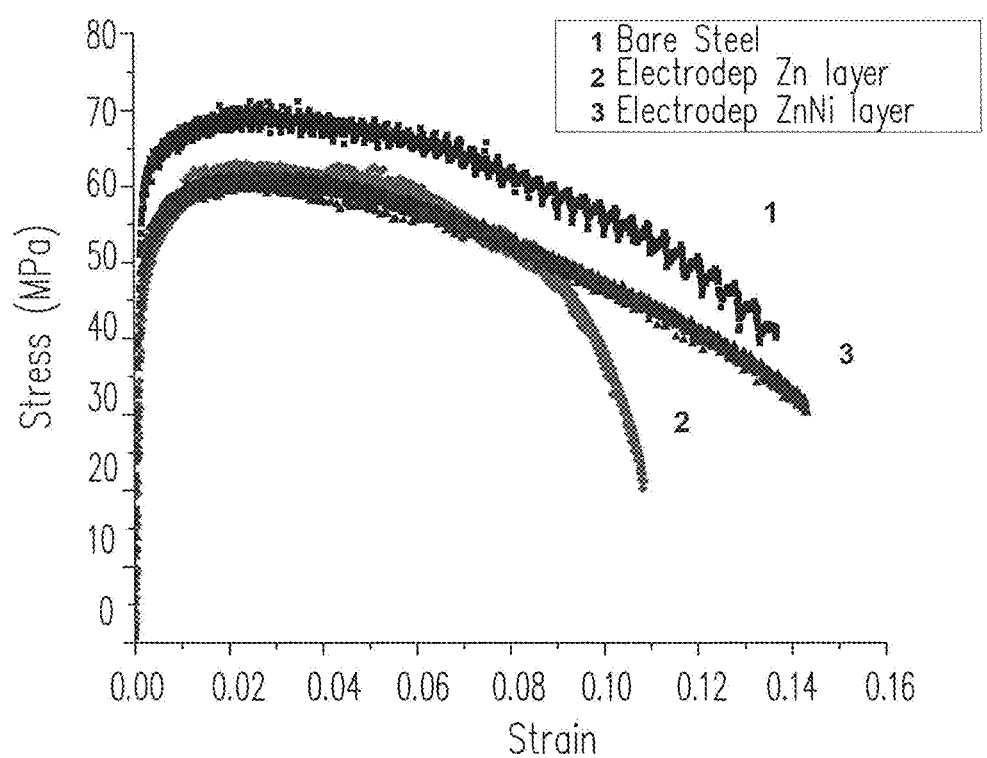
FIG. 17 shows the high-temperature tensile test results of three different steel sheets.

FIG. 14, FIG. 12, and FIG. 13 respectively show the binding energy analysis spectrum of XPS of the sample of each of embodiment 1 to embodiment 3. In particular, the top-left figure shows three-dimensional graphics; the upper-right, lower-left, and lower-right show the 2nd, 5th, and 8th curves of the upper-left figure in order, wherein the etch time increases in that order, indicating the positions shown gradually enter the samples from the sites near the surface. It can be known from FIG. 14 that, the signal of the electroplated Cr layer is not detected on the surface of the samples; the signal of the electroplated Cr layer begins to appear at a greater depth, and the signal of $ZnCr_2O_4$ is gradually weakened (content is gradually decreased).

According to the analysis of each of FIG. 14 to FIG. 13, the spectra of each element in each sample varying with depth can be illustrated, and the obtained results are shown in FIG. 14 to FIG. 14.

It can be known by comparing FIG. 14 and FIG. 12 that, when the content of carbon of the chromium-carbon layer is lower (5 at %), the amount of Zn on the surface thereof is also very low. Therefore, the low amount of Zn may not be sufficient to form the spinel structure of $ZnCr_2O_4$ on the surface. In contrast, when the content of carbon of the chromium-carbon layer is higher (12 at %), the amount of Zn is significantly increased near the surface of the sample, indicating that Zn is more easily diffused to the surface of the sample under such condition, thus facilitating the formation of $ZnCr_2O_4$. Moreover, according to experimental results, the inventors further discovered that, a more compact oxide is formed on the surface of the sample of embodiment 1 after heat treatment, and an island-shaped oxide that is not dense is formed on the surface of the sample of comparative embodiment 1. The reason thereof may be that the decrease of carbon vacancies retards the diffusion of zinc in the chromium-carbon layer, thus causing insufficient zinc oxide on the surface of the sample. As a result, the spinel structure of $ZnCr_2O_4$ cannot be formed.

Moreover, it can be seen from FIG. 12, FIG. 13, and FIG. 14 that, the higher the content of nickel in the zinc-nickel alloy coating layer (gradually increased from 16 at % to 30 at %), the higher the melting point of the coating layer. As a result, the content of zinc diffused to the surface is gradually decreased, which may make the formed spinel structure thinner.

The inventors also confirmed that $ZnCr_2O_4$ was indeed grown on the sample of each of embodiments 1 to 3 after heat treatment via an X-ray analysis technique. FIG. 12 and FIG. 13 respectively show the X-ray diffraction spectrum of the sample of each of embodiments 1 to 3 before heat treatment and after heat treatment. It can be seen from the figures that diffraction peaks of ZnO and $ZnCr_2O_4$ appeared tor the samples of all embodiments after the heat treatment.

Lastly, FIG. 14 shows the results of three different high-temperature tensile tests (900° C., tensile speed of $0.13 \, s^{-1}$), wherein the tests were respectively performed on a steel sheet without a coating layer (commercialized low-carbon steel, components are the same as the steel plate of embodiment 1), an electroplated zinc steel sheet, and an electroplated zinc-nickel alloy (16 at % Ni) steel sheet. It can be seen from FIG. 14 that, when a coating layer is applied to the steel sheet, the strength of the steel sheet is Inevitably slightly decreased. However, since the melting point (thermal stability) of the zinc-nickel alloy is significantly higher than that of metal zinc, the LMIE effect does not readily occur. As a result, the mechanical properties of the steel sheet having a zinc-nickel alloy coating layer are far superior to the steel sheet having a metal zinc coating layer.

Although the invention has been described with reference to the above embodiments, the invention is not limited thereto. It will be apparent to one of the ordinary skill in the art that modifications to the described embodiments may be made without departing from the spirit of the Invention. Accordingly, the scope of the invention is defined by tire attached claims and not by the above detailed descriptions.

What is claimed is:

1. A steel sheet, comprising an iron-based material, a first coating layer disposed on the iron-based material, and a second coating layer disposed on the first coating layer, wherein the first coating layer comprises a zinc alloy and the second coating layer consists essentially of chromium and carbon, and chromium of the second coating layer has a crystal structure with carbon doped in the chromium crystal structure, wherein a content of carbon in the second coating layer is greater than 10 at. %.

2. The steel sheet as claimed in claim 1, wherein the zinc alloy is a zinc-nickel alloy, a zinc-cobalt alloy, or a combination thereof.

3. The steel sheet as claimed in claim 1, wherein the zinc alloy is a zinc-nickel alloy, and a proportion of nickel thereof is between 16 at. % and 30 at. %.

4. The steel sheet as claimed in claim 1, wherein the zinc alloy is a zinc-nickel alloy, and a proportion of nickel thereof is about 20 at. %.

5. The steel sheet as claimed in claim 1, wherein a reduction potential of the zinc alloy is less than a reduction potential of the iron-based material by at least 100 mV.

6. The steel sheet as claimed in claim 1, wherein a melting point of the zinc alloy is higher than an austenitizing temperature of the iron-based material.

7. The steel sheet as claimed in claim 1, wherein thicknesses of each of the first coating layer and the second coating layer are respectively 2 μm to 100 μm and 0.1 μm to 10 μm.

8. A fabrication method of a steel sheet, comprising:
providing an iron-based steel material;
forming a first coating layer on a surface of the iron-based steel material; and
forming a second coating layer on the first coating layer, wherein the first coating layer comprises a zinc alloy and the second coating layer consists essentially of chromium and carbon, and chromium of the second coating layer has a crystal structure with carbon doped in the chromium crystal structure, wherein a content of carbon in the second coating layer is greater than 10 at. %.

9. The method as claimed in claim 8, further comprising forming a surface layer on the second coating layer, wherein the surface layer comprises $ZnCr_2O_4$.

10. The method as claimed in claim 9, wherein the surface layer further comprises ZnO and $Cr_2O_3$.

11. The method as claimed in claim 8, further comprising performing a heating step to remove substantially all carbon in the second coating layer.

12. The method as claimed in claim 8, further comprising performing a heating step to oxidize chromium on a surface of the second coating layer and remove substantially all carbon in the second coating layer.

13. The method as claimed in claim 12, wherein the heating step makes zinc in the first coating layer diffuse to the surface of the second coating layer.

14. The method as claimed in claim 13, wherein the heating step oxidizes zinc that is diffused to the surface of the second coating layer.

* * * * *